(12) United States Patent
Hwang et al.

(10) Patent No.: US 12,199,421 B2
(45) Date of Patent: Jan. 14, 2025

(54) BATTERY DISCONNECT UNIT INCLUDING MOVING PLATE

(71) Applicant: LG Energy Solution, Ltd., Seoul (KR)

(72) Inventors: Sung Tack Hwang, Daejeon (KR); Won Tae Lee, Daejeon (KR); Jae Hyuk Cha, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 159 days.

(21) Appl. No.: 17/926,827

(22) PCT Filed: Jun. 17, 2021

(86) PCT No.: PCT/KR2021/007596
§ 371 (c)(1),
(2) Date: Nov. 21, 2022

(87) PCT Pub. No.: WO2022/014879
PCT Pub. Date: Jan. 20, 2022

(65) Prior Publication Data
US 2023/0198245 A1    Jun. 22, 2023

(30) Foreign Application Priority Data

Jul. 15, 2020    (KR) .................. 10-2020-0087783

(51) Int. Cl.
*H02H 7/18*    (2006.01)
*H01M 10/42*    (2006.01)
(Continued)

(52) U.S. Cl.
CPC ............ *H02H 7/18* (2013.01); *H01M 50/583* (2021.01); *H02H 1/0007* (2013.01); *H01M 2010/4271* (2013.01)

(58) Field of Classification Search
CPC ........ H01M 2010/4271; H01M 50/583; H02H 7/18
See application file for complete search history.

(56) References Cited

U.S. PATENT DOCUMENTS

2005/0116488 A1    6/2005  Sakakibara
2010/0271168 A1*  10/2010  Niedzwiecki .......... H01H 9/102
                                                          337/194
(Continued)

FOREIGN PATENT DOCUMENTS

CN        209929386 U    1/2020
EP          3010072 A1   4/2016
(Continued)

OTHER PUBLICATIONS

International Search Report for PCT/KR2021/007596 mailed Sep. 23, 2021. 3 pgs.
(Continued)

*Primary Examiner* — Jared Fureman
*Assistant Examiner* — Christopher J Clark
(74) *Attorney, Agent, or Firm* — Lerner David LLP

(57) ABSTRACT

The present invention relates to a battery disconnect unit including a fuse connected to a battery pack, the fuse being configured to interrupt overcurrent of the battery pack, at least one sensor configured to measure voltage or current of the battery pack, at least one relay configured to connect or disconnect the battery pack and the load to or from each other based on a value of the voltage or the current measured by the sensor, a housing configured to allow the fuse, the sensor, and the relay to be mounted therein, and a moving plate configured to fix the relay and the sensor to the housing, the position of the moving plate being changeable depending on sizes of the relay and the sensor.

10 Claims, 5 Drawing Sheets

(51) Int. Cl.
*H01M 50/583* (2021.01)
*H02H 1/00* (2006.01)

(56) References Cited

U.S. PATENT DOCUMENTS

| | | | |
|---|---|---|---|
| 2015/0295283 A1* | 10/2015 | Eom | H01M 10/425 |
| | | | 429/61 |
| 2016/0072118 A1 | 3/2016 | Park et al. | |
| 2016/0072166 A1 | 3/2016 | Park et al. | |
| 2016/0351868 A1* | 12/2016 | Eom | H01M 10/482 |
| 2016/0372736 A1 | 12/2016 | Kim et al. | |
| 2017/0365887 A1 | 12/2017 | Kwon et al. | |
| 2018/0198101 A1 | 7/2018 | Sheeks et al. | |
| 2018/0198294 A1 | 7/2018 | Sheeks et al. | |
| 2019/0296291 A1 | 9/2019 | Eom et al. | |
| 2021/0234381 A1 | 7/2021 | Sheeks et al. | |

FOREIGN PATENT DOCUMENTS

| | | |
|---|---|---|
| EP | 3091591 A1 | 11/2016 |
| JP | 4258437 B2 | 4/2009 |
| JP | 2012524965 A | 10/2012 |
| KR | 20100057205 A | 5/2010 |
| KR | 101104849 B1 | 1/2012 |
| KR | 20150064620 A | 6/2015 |
| KR | 20150097017 A | 8/2015 |
| KR | 20160008948 A | 1/2016 |
| KR | 101737489 B1 | 5/2017 |
| KR | 101743701 B1 | 6/2017 |
| KR | 20170142442 A | 12/2017 |
| KR | 20190002154 U | 8/2019 |

OTHER PUBLICATIONS

Extended European Search Report including Written Opinion for Application No. 21843086.6 dated Jun. 24, 2024, pp. 1-6.

* cited by examiner

[ FIG. 1 ]
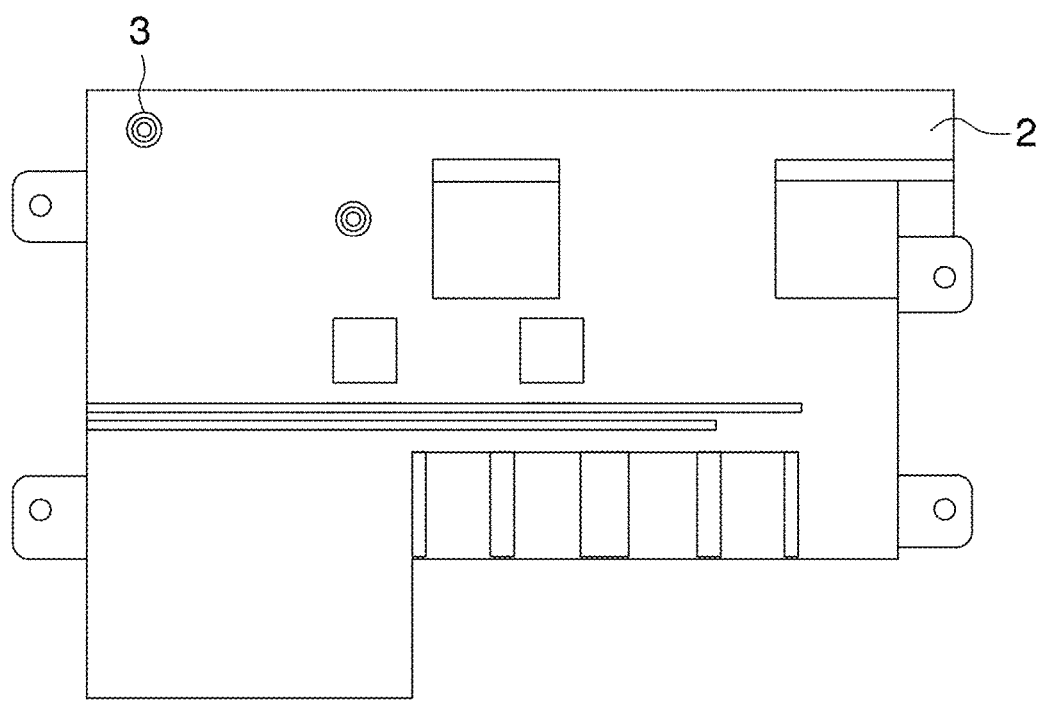
PRIOR ART

[FIG. 2]
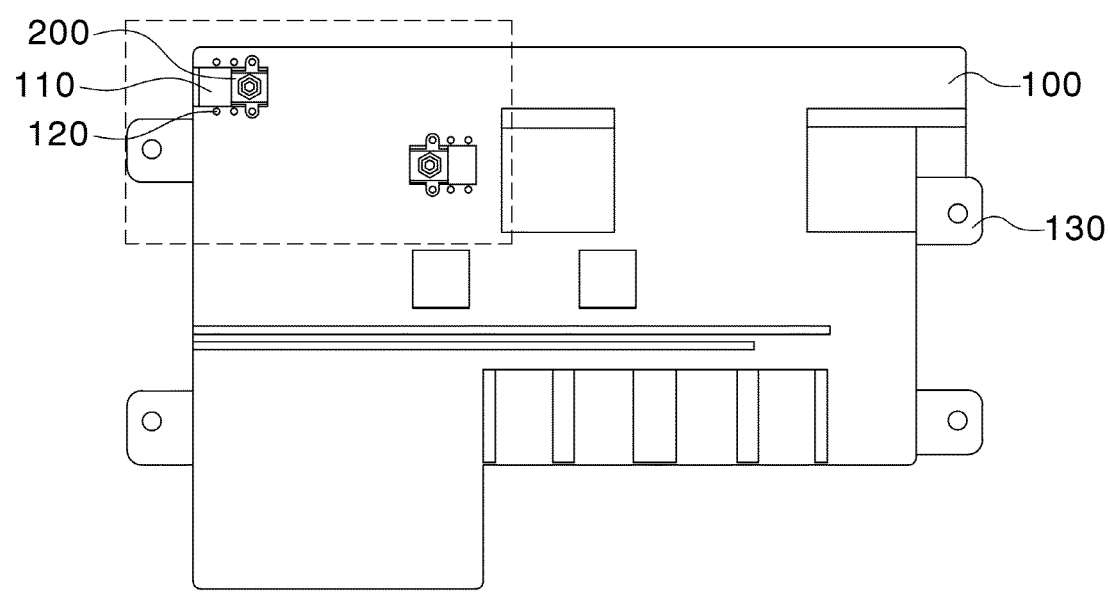

[FIG. 3]
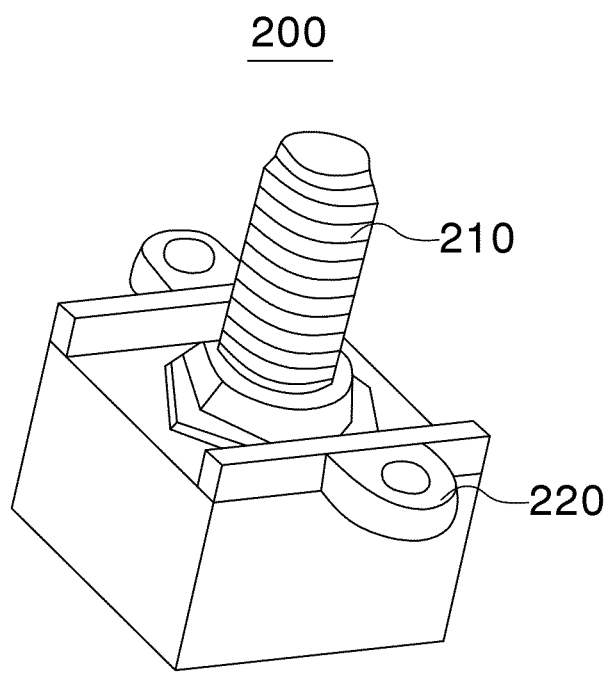

[FIG. 4]
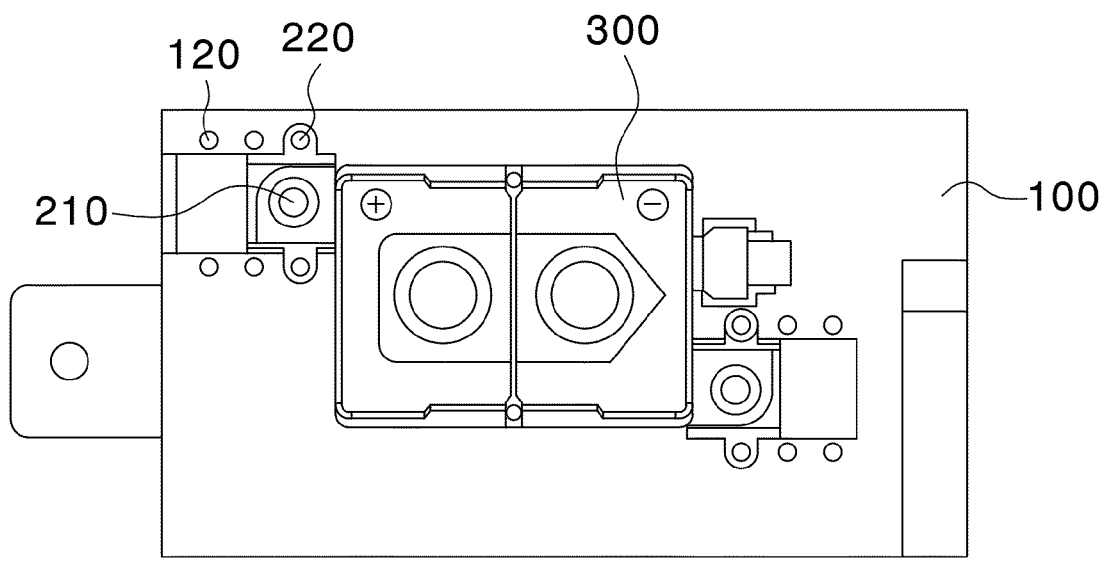

[FIG. 5]
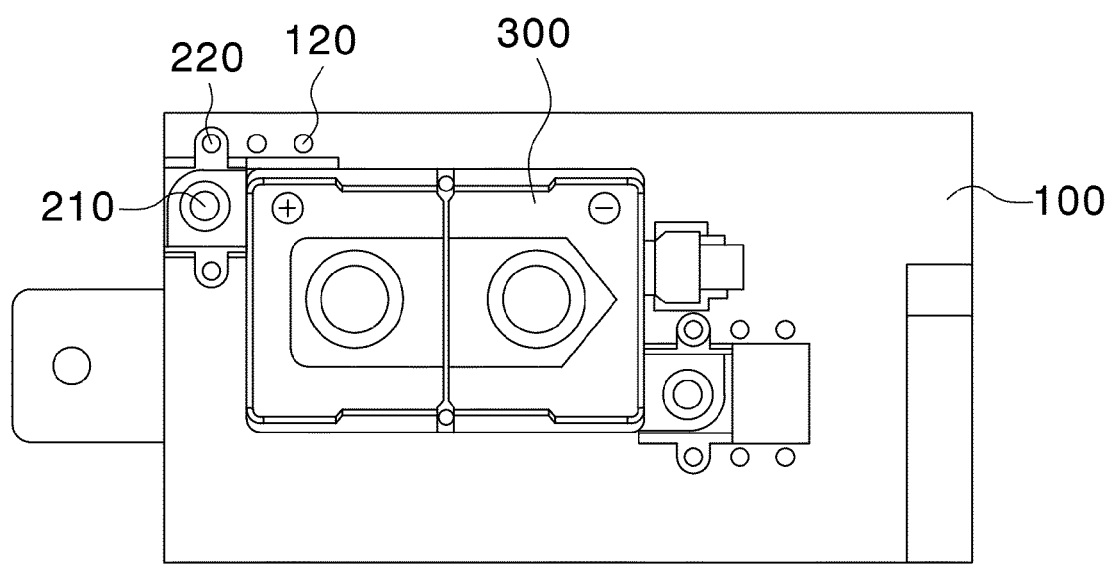

BATTERY DISCONNECT UNIT INCLUDING MOVING PLATE

CROSS-REFERENCE TO RELATED APPLICATIONS

This application is a national stage entry under 35 U.S.C. § 371 of International Application No. PCT/KR2021/007596, filed on Jun. 17, 2021, which claims priority to Korean Patent Application No. 10-2020-0087783, filed on Jul. 15, 2020, the disclosures of which are hereby incorporated herein by reference in their entireties.

TECHNICAL FIELD

The present invention relates to a battery disconnect unit capable of mounting electric parts on the same housing by the provision of a moving plate even in the case in which the electric parts have different sizes.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

In the case in which the battery cell is used in the form of a module or a pack, as described above, the battery cell may be damaged by overheating when the battery cell is abnormal, e.g. when overcurrent flows in the battery cell. Consequently, it is necessary to measure and monitor values of states, such as voltage and current, of the battery cell in order to prevent the battery cell from being overcharged or overdischarged.

To this end, a battery disconnect unit (BDU) is provided in a battery management system (BMS). In general, the battery disconnect unit is configured to have a structure in which electric parts, such as a fuse, a relay, and a sensor, are mounted in a housing.

FIG. 1 is a plan view of a housing having only an insert bolt coupled thereto in a conventional battery disconnect unit.

When describing the conventional housing with reference to FIG. 1, the housing is provided with an insert bolt 3 configured to fix a relay or a sensor mounted in the housing, and the relay or the sensor is fastened to the housing 2 using the insert bolt 3.

In the conventional battery disconnect unit, however, the position of the insert bolt 3 in the housing 3 is fixed. In the case in which the size of the electric part is changed depending on the construction or capacity of a batty pack, therefore, a new housing 2 must be developed in response thereto.

As a result, development expenses are increased, and profitability is reduced.

DISCLOSURE

Technical Problem

The present invention has been made in view of the above problems, and it is an object of the present invention to provide a battery disconnect unit including a moving plate configured such that the position of the moving plate in a housing is changeable depending on the size of an electric part, whereby it is possible to mount the electric part in the same housing even though the size of the electric part is changed.

Technical Solution

In order to accomplish the above object, the present invention provides a battery disconnect unit configured to electrically disconnect a battery pack from a load to protect the load when the battery pack is abnormal, the battery disconnect unit including a fuse connected to the battery pack, the fuse being configured to interrupt overcurrent of the battery pack, at least one sensor configured to measure voltage or current of the battery pack, at least one relay configured to connect or disconnect the battery pack and the load to or from each other based on the value of the voltage or the current measured by the sensor, a housing configured to allow the fuse, the sensor, and the relay to be mounted therein, and a moving plate configured to fix the relay and the sensor to the housing, the position of the moving plate being changeable depending on sizes of the relay and the sensor.

Also, in the battery disconnect unit according to the present invention, the housing may include an insertion portion configured to allow the moving plate to be inserted thereinto and a first fastening portion configured to fasten the moving plate to the housing.

Also, in the battery disconnect unit according to the present invention, the first fastening portion may be provided with a plurality of pairs of fastening holes spaced apart from each other by a predetermined distance such that each pair of fastening holes faces each other in the state in which the insertion portion is interposed therebetween.

Also, in the battery disconnect unit according to the present invention, the housing may further include a fixing portion configured to fix the housing to a device equipped with the battery disconnect unit.

Also, in the battery disconnect unit according to the present invention, the moving plate may include an insert bolt configured to fix the relay and the sensor.

Also, in the battery disconnect unit according to the present invention, the moving plate may include a second fastening portion coupled to the first fastening portion, the second fastening portion being configured to mechanically fasten the housing and the moving plate to each other.

Also, in the battery disconnect unit according to the present invention, the relay may be provided in two or more.

In addition, a battery management system (BMS) according to the present invention includes the battery disconnect unit according to the present invention.

In addition, a device according to the present invention includes the battery management system according to the present invention.

In addition, the device according to the present invention may be any one of an electric vehicle (EV), a hybrid electric vehicle (HEV), and a plug-in hybrid electric vehicle (P-HEV).

Advantageous Effects

A battery disconnect unit according to the present invention has an advantage in that the battery disconnect unit includes a moving plate, whereby it is possible to commonly use an existing housing without new housing development or replacement even though the sizes of electric parts mounted in a housing are changed.

In addition, the battery disconnect unit according to the present invention has an advantage in that the battery disconnect unit commonly uses the housing by the provision of the moving plate, whereby it is possible to reduce new housing development expenses.

DESCRIPTION OF DRAWINGS

FIG. 1 is a plan view of a housing having only an insert bolt coupled thereto in a conventional battery disconnect unit.

FIG. 2 is a plan view of a housing having only a moving plate according to an embodiment of the present invention fastened thereto.

FIG. 3 is a perspective view of the moving plate according to the embodiment of the present invention.

FIG. 4 is a plan view showing a portion of the housing in the state in which a relay according to an embodiment of the present invention is mounted in the housing.

FIG. 5 is a plan view showing a portion of the housing in the state in which a relay according to another embodiment of the present invention is mounted in the housing.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery disconnect unit according to the present invention will be described with reference to the accompanying drawings.

FIG. 2 is a plan view of a housing having only a moving plate according to an embodiment of the present invention fastened thereto, and FIG. 3 is a perspective view of the moving plate according to the embodiment of the present invention.

When describing the housing 100 and the moving plate 200 according to the present invention with reference to FIGS. 2 and 3, the housing 100 includes an insertion portion 110 configured to allow the moving plate 200 to be inserted thereinto, a first fastening portion 120 configured to fasten the moving plate 200 to the housing 100, and a fixing portion 130 configured to fix the housing 100 having electric parts mounted therein to a device equipped with the battery disconnect unit.

Here, the first fastening portion 120 is provided with a plurality of pairs of fastening holes spaced apart from each other by a predetermined distance such that each pair of fastening holes faces each other in the state in which the insertion portion 110 is interposed therebetween, whereby the moving plate 200 may be moved and fastened to the housing depending on the sizes of the electric parts mounted on the housing 100.

Meanwhile, the electric parts used in the battery disconnect unit are a relay, a sensor, a fuse, etc. One or more of the electric parts may be mounted on the housing 100 depending on the construction of the battery disconnect unit.

In addition, the moving plate 200 includes an insert bolt 210 coupled to the electric parts so as to fix the electric parts to the housing 100 and a second fastening portion 220 fastened to the first fastening portion via a bolt while overlapping the first fastening portion 120 of the housing 100 so as to mechanically fasten the moving plate 200 to the housing 100.

One or more moving plates 200 may be provided in one housing 100.

That is, the number of moving plates 200 may be flexibly set based on the number of electric parts mounted in the housing 100.

The first fastening portion 120 and the second fastening portion 220 are fastened to each other using a mechanical fastening means, such as a bolt, as described above, whereby coupling and separation therebetween are easily performed, and the plurality of pairs of first fastening portions is formed so as to be spaced apart from each other by the predetermined distance, whereby the moving plate 200 is fixed at an appropriate position based on the sizes of the electric parts to be mounted. Consequently, it is possible to manufacture various battery disconnect units using the same housing 100 without provision of a separate new housing depending on the construction of a battery pack.

FIG. 4 is a plan view showing a portion of the housing in the state in which a relay according to an embodiment of the present invention is mounted in the housing, and FIG. 5 is a plan view showing a portion of the housing in the state in which a relay according to another embodiment of the present invention is mounted in the housing.

That is, FIGS. 4 and 5 are figures showing the cases in which relays 300 having different sizes are mounted in the part indicated by a dotted line in FIG. 2, respectively.

A method of mounting the electric parts using the housing 100 having the moving plate 200 applied thereto without change of the housing 100 even in the case in which the sizes of the electric parts are different will be described with reference to FIGS. 4 and 5.

Although FIGS. 4 and 5 show the cases in which the sizes of the relays 300, among the electric parts, are different, the same may be equally applied to the cases in which the sizes of the electric parts other than the relays 300 are different.

First, in order to mount the relay 300, the moving plate 200 is located at the insertion portion 110 of the housing 100 based on the size of the relay 300, and the first fastening portion 120 and the second fastening portion 220 are fastened to each other via a bolt, whereby the moving plate 200 is fixed to the housing 100.

That is, in the case in which a relay 300 having a relatively small size is mounted, as shown in FIG. 4, two moving plates 200 located at opposite sides of the relay 300 are fixed to ones of the first fastening portions 120 of the housing 100 that have the shortest straight distance therebetween. In the case in which a relay 300 having a larger size than the relay 300 of FIG. 4 is mounted, as shown in FIG. 5, two moving plates 200 located at opposite sides of the relay 300 are fixed to ones of the first fastening portions of the housing that have a longer straight distance therebetween than in FIG. 4. Consequently, it is possible to flexibly cope with the size of the relay 300 that is mounted.

Next, the relay 300 is coupled to the insert bolts 210 of the fixed moving plates 200, whereby the relay 300 may be fixed to the housing 100.

Although not shown in the figures, various electric parts, such as sensors having different sizes, may be mounted in the same housing 100 using the same process through application of only the moving plates 200.

Since the moving plates 200 are applied, as described above, it is possible to use the same housing 100 even in the case in which electric parts having different sizes are mounted depending on the construction and capacity of a battery pack, whereby it is possible to reduce burden in developing new housings depending on the battery pack.

The battery disconnect unit according to the present invention described above may be applied to a battery management system (BMS), whereby it is possible to mount batteries having various constructions in various kinds of devices.

Here, the BMS estimates states of a battery, such as state of charge (SOC), state of health (SOH), the maximum input and output power allowance amount, and output voltage, and manages the battery using the estimated state information.

In addition, it is possible to control charging and discharging of the battery and to estimate replacement time of the battery using the state information.

In particular, the BMS is applied to a device, such as an electric vehicle (EV), a hybrid electric vehicle (HEV), or a plug-in hybrid electric vehicle (P-HEV), to stably drive the battery.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS 2, 100: Housings
3, 210: Insert bolts
110: Insertion portion
120: First fastening portion
130: Fixing portion
200: Moving plate
220: Second fastening portion
300: Relay

The invention claimed is:

1. A battery disconnect unit configured to electrically disconnect a battery pack from a load to protect the load when the battery pack is in an abnormal state, the battery disconnect unit comprising:
   a fuse connected to the battery pack, the fuse being configured to interrupt an overcurrent of the battery pack;
   at least one sensor configured to measure a voltage or a current of the battery pack;
   at least one relay configured to connect or disconnect the battery pack and the load to or from each other based on a value of the voltage or a value of the current measured by the at least one sensor;
   a housing configured to receive the fuse, the sensor, and the relay mounted thereon; and
   a moving plate configured to fix the relay and the sensor to the housing, the moving plate being movable to a plurality of positions depending on a size of the relay and a size of the sensor.

2. The battery disconnect unit according to claim 1, wherein the housing comprises:
   an insertion portion configured to receive the moving plate inserted thereinto; and
   a first fastening portion configured to fasten the moving plate to the housing.

3. The battery disconnect unit according to claim 2, wherein the first fastening portion has a plurality of pairs of fastening holes spaced apart from each other by a predetermined distance such that each of the plurality of pairs of fastening holes faces each other with the insertion portion interposed therebetween.

4. The battery disconnect unit according to claim 3, wherein the housing further comprises a fixing portion configured to fix the housing to a device containing the battery disconnect unit.

5. The battery disconnect unit according to claim 3, wherein the moving plate comprises an insert bolt configured to fix the relay and the sensor to the housing.

6. The battery disconnect unit according to claim 3, wherein the moving plate comprises a second fastening portion coupled to the first fastening portion, the second fastening portion being configured to mechanically fasten the housing and the moving plate to each other.

7. The battery disconnect unit according to claim 1, wherein the at least one relay is two or more relays.

8. A battery management system (BMS) comprising the battery disconnect unit according to claim 1.

9. A device comprising the battery management system according to claim 8.

10. The device according to claim 9, wherein the device is any one of an electric vehicle (EV), a hybrid electric vehicle (HEV), or a plug-in hybrid electric vehicle (P-HEV).

* * * * *